(12) United States Patent
Hunt

(10) Patent No.: US 10,962,095 B2
(45) Date of Patent: Mar. 30, 2021

(54) TORQUE CONVERTER ASSEMBLY WITH DISCONNECT CLUTCH

(71) Applicant: SCHAEFFLER TECHNOLOGIES AG & CO. KG, Herzogenaurach (DE)

(72) Inventor: Kenneth Hunt, Wooster, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 113 days.

(21) Appl. No.: 16/364,904

(22) Filed: Mar. 26, 2019

(65) Prior Publication Data

US 2020/0309240 A1 Oct. 1, 2020

(51) Int. Cl.
| | |
|---|---|
| *F16H 45/02* | (2006.01) |
| *F16H 45/00* | (2006.01) |
| *F16D 15/00* | (2006.01) |
| *B60K 6/387* | (2007.10) |

(52) U.S. Cl.
CPC ............ *F16H 45/00* (2013.01); *B60K 6/387* (2013.01); *F16D 15/00* (2013.01); *F16H 45/02* (2013.01); *B60Y 2200/92* (2013.01); *F16H 2045/002* (2013.01)

(58) Field of Classification Search
CPC .... B60K 6/387; F16H 2045/002; F16H 45/02
See application file for complete search history.

(56) References Cited

U.S. PATENT DOCUMENTS

| | | | |
|---|---|---|---|
| 6,899,210 | B2 | 5/2005 | Tomiyama |
| 9,709,147 | B2 * | 7/2017 | Steinberger .............. B60K 6/38 |
| 2015/0014113 | A1 | 1/2015 | Ohr et al. |
| 2016/0105060 | A1 | 4/2016 | Lindemann et al. |
| 2016/0109010 | A1 | 4/2016 | Lindemann et al. |
| 2018/0355961 | A1 | 12/2018 | Hsu et al. |
| 2020/0049245 | A1 * | 2/2020 | Yin ........................ B60K 6/387 |

FOREIGN PATENT DOCUMENTS

EP          1022491 A2       7/2000

* cited by examiner

*Primary Examiner* — Stacey A Fluhart
(74) *Attorney, Agent, or Firm* — Brooks Kushman P.C.

(57) ABSTRACT

A torque converter assembly includes an input plate connectable to a powerplant, a torque converter, and a disconnect clutch external to the torque converter and configured to selectively couple the input plate to the torque converter. The torque converter includes a cover having an outer surface and at least one fluid hole extending through the cover. The disconnect clutch is actuated by pressurized fluid via the fluid hole.

17 Claims, 3 Drawing Sheets

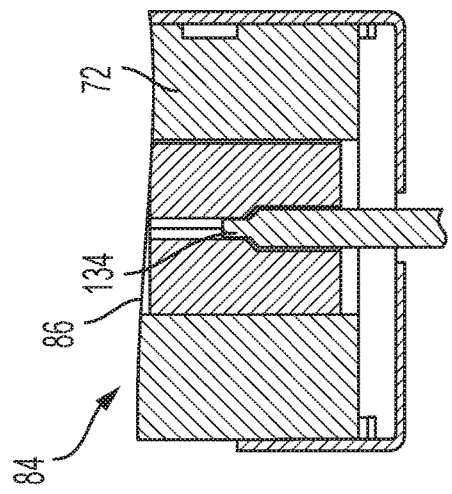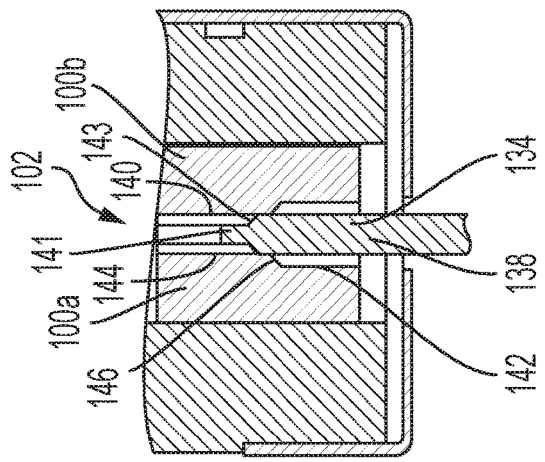
FIG. 4A
FIG. 4B
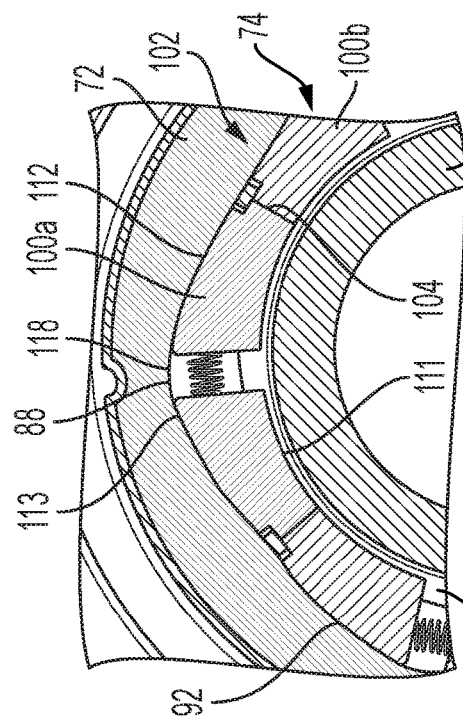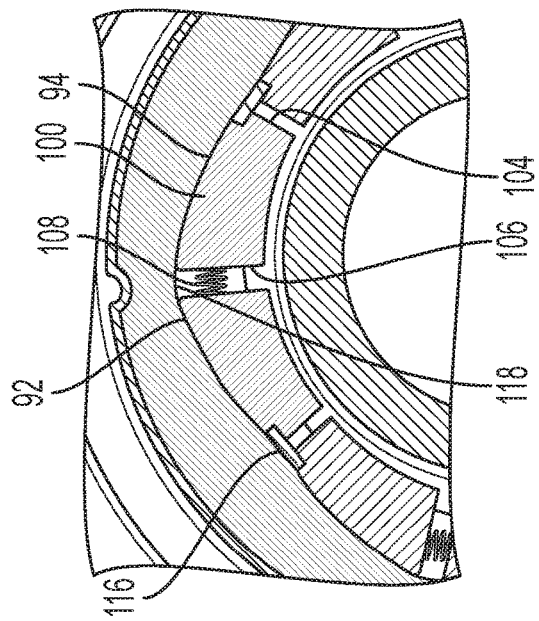
FIG. 3A
FIG. 3B

TORQUE CONVERTER ASSEMBLY WITH DISCONNECT CLUTCH

TECHNICAL FIELD

The present disclosure relates to torque converter assemblies having a disconnect clutch that selectively couples the torque converter to a powerplant.

BACKGROUND

Some hybrid vehicles include an engine, a motor/generator (M/G), and an automatic transmission arranged in series. The automatic transmissions may include a torque converter for coupling a transmission input shaft to a crankshaft of an engine. The torque converter may include an impeller fixed to the crankshaft, a turbine fixed to the input shaft, and a stator disposed between the impeller and the turbine. The torque converter may also include a bypass clutch to mechanically couple the transmission input shaft to the case of the torque converter, which is fixed to the crankshaft. The bypass clutch may include one or more clutch plates that rotate with the case and are interleaved with one or more disks that rotate with the input shaft. To engage the clutch, pressurized fluid forces a piston to compress the plates and disks.

A disconnect clutch may be used to couple and decouple the engine from the M/G, the torque converter, or both depending upon design. The disconnect clutch is used to decouple the engine from the powertrain when in electric mode.

SUMMARY

According to one embodiment, a torque converter assembly includes an input plate connectable to a powerplant, a torque converter, and a disconnect clutch external to the torque converter and configured to selectively couple the input plate to the torque converter. The torque converter includes a cover having an outer surface and at least one fluid hole extending through the cover. The disconnect clutch is actuated by pressurized fluid via the fluid hole.

According to another embodiment, a torque converter assembly includes an input plate connectable to a powerplant and a torque converter having a cover with an outer surface and at least one fluid hole extending through the cover. A disconnect clutch of the assembly selectively couples the input plate to the torque converter. The disconnect clutch includes a first member fixedly coupled to the input plate, a second member fixedly coupled to the cover, and a piston adjacent to the outer surface of the cover to be acted on by fluid within a hydrodynamic chamber of the torque converter via the fluid hole. The piston is axially movable, according to a pressure of the fluid, between a first position corresponding to the disconnect clutch being engaged and a second position corresponding to the disconnect clutch being disengaged.

According to yet another embodiment, a torque converter assembly includes an input plate, a torque converter having a cover defining a hydrodynamic chamber, a bypass clutch disposed within the hydrodynamic chamber, and a disconnect clutch configured to selectively couple the input plate to the cover. The disconnect clutch is external to the hydrodynamic chamber and has an external piston seated on an outer surface of the cover to be axially movable and in fluid communication with the hydrodynamic chamber.

BRIEF DESCRIPTION OF THE DRAWINGS

FIG. 3A is an axial cross-sectional view of an example disconnect clutch in a locked position.

FIG. 3B is an axial cross-sectional view of the disconnect clutch in an unlocked position.

FIG. 4A is a top cross-sectional view of the disconnect clutch in the locked position.

FIG. 4B is a top cross-sectional view of the disconnect clutch in the unlocked position.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This disclosure sets forth a combined disconnect clutch and torque converter, referred to herein as a torque converter assembly, for use with hybrid vehicles for example. The torque converter assembly is configured to receive input torque from an engine and/or at least one electric machine, and output that torque to an input shaft of a transmission. The torque converter assembly can replace separate disconnect clutch and torque converter assemblies to create a more compact powertrain package.

Figure 1:
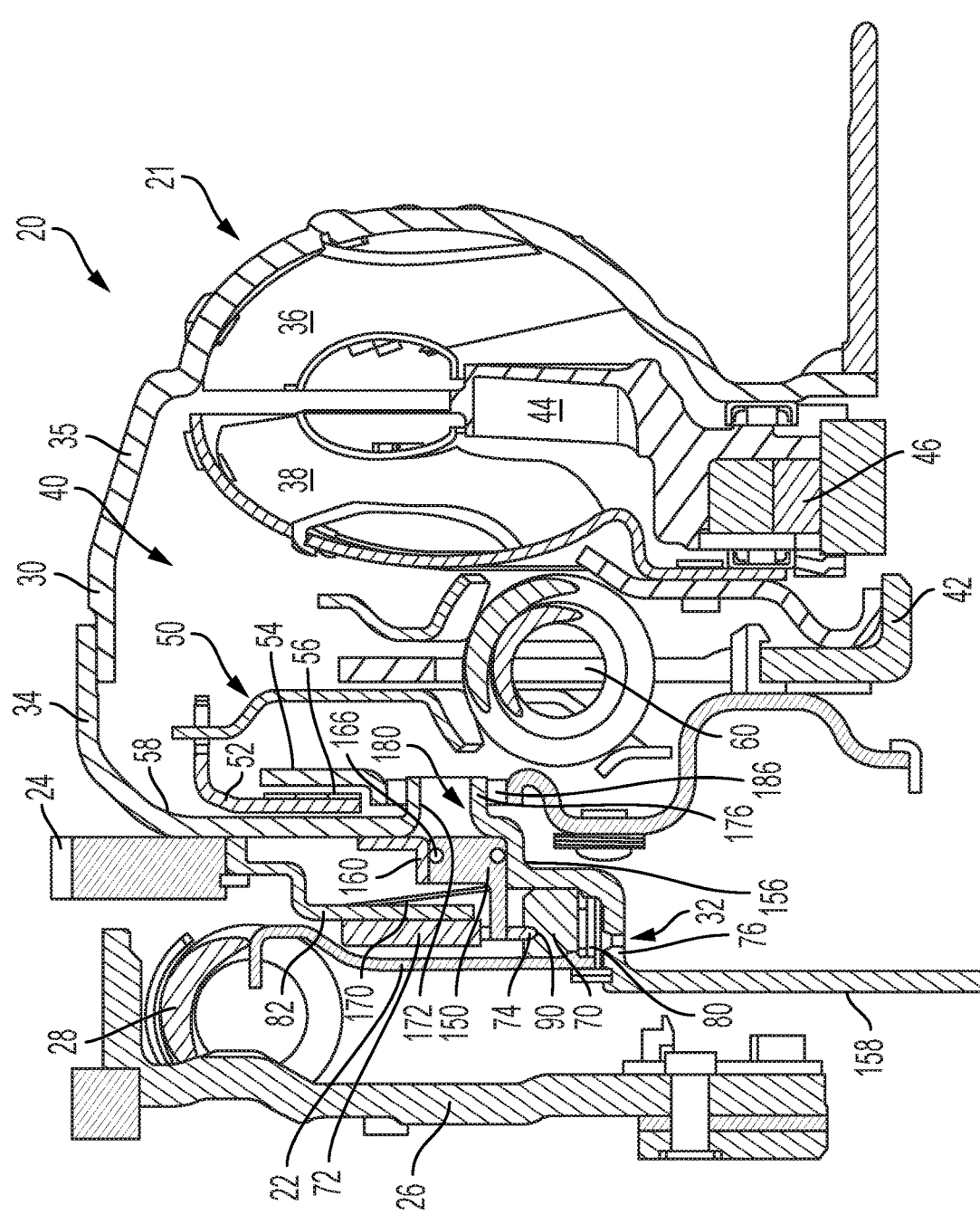
FIG. 1 is a side cross-sectional view of a torque converter assembly having a disconnect clutch and a torque converter in a combined assembly.
Figure 2:
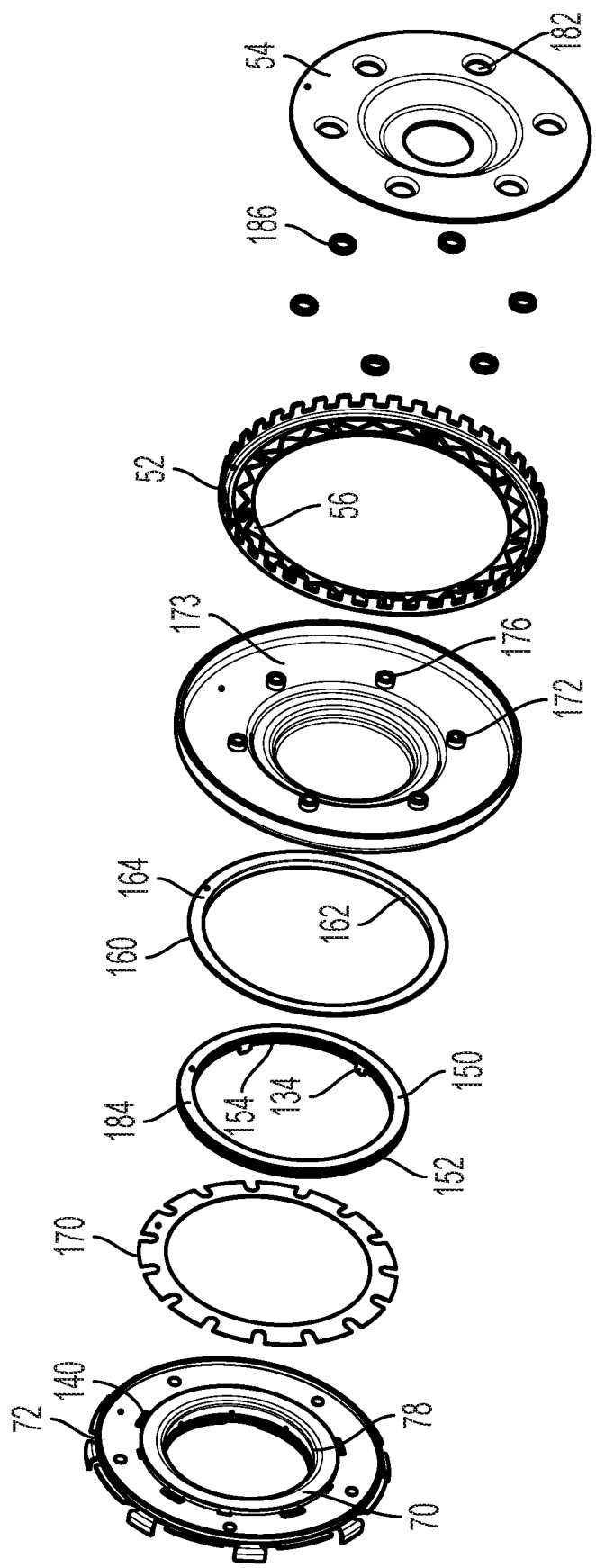
FIG. 2 is a partial exploded view of the torque converter assembly.

Referring to FIGS. 1 and 2, a torque converter assembly 20 includes a first input 22 and a second input 24. The first input 22 is configured to fixedly couple with an engine (not shown). The first input 22 may be an annular plate connected to a flex plate 26 (also known as a flywheel) of an engine via a damper 28. The second input 24 is configured to fixedly couple to an electric machine (not shown). The second input 24 may be a ring gear, a spur gear, a sprocket, a pully, or any other means capable of being driveably connected to the electric machine.

The torque converter assembly 20 includes a torque converter 21 having a cover 30 that receives power from the first input 22, the second input 24, or both. The cover 30 may receive power through either fixed coupling (e.g., direct connection) or selective coupling (e.g., a clutch). A group of rotating elements are fixedly coupled to one another if they are constrained to rotate as a unit in all operating conditions. Rotating elements can be fixedly coupled by spline connections, welding, press fitting, machining from a common solid, dampers, or other means. Slight variations in rotational displacement between fixedly coupled elements can occur such as displacement due to lash, shaft compliance, or damper oscillations. In contrast, two rotating elements are selectively coupled by a clutch or other device when the clutch or other device constrains them to rotate as a unit whenever it is fully engaged and they are free to rotate at distinct, unrelated speeds in at least some other operating condition. Two elements are coupled if they are either fixedly coupled or selectively coupled.

The torque converter assembly 20 also includes a disconnect clutch 32. The disconnect clutch 32 may selectively couple the input 22 to the cover 30. The second input 24 may be fixedly coupled to the cover 30. The cover 30 may include a front cover 34 and a rear cover 35 that are joined to each other such as by welding or the like. An impeller 36 is fixed to the rear cover 35 and rotates with the cover 30. A turbine 38 is disposed adjacent to the impeller 36 within a hydrodynamic chamber 40 of the torque converter 21. The turbine 38 is coupled to a turbine hub 42 that is connected, e.g. splined, to a transmission input shaft (not shown) that supplies power to a gearbox of the transmission. The impeller 36 and the turbine 38 are designed to fluid couple creating a hydrodynamic power flow path.

A stator 44 is supported on to a stator shaft (not shown) by a one-way clutch 46. The stator shaft is fixed to a front support of the transmission and is stationary relative to the torque converter assembly 20. When the transmission input shaft is stationary or rotating slowly compared to the crankshaft, the one-way clutch 46 holds the stator 44 stationary. Rotation of the impeller 36 forces fluid to move between the impeller 36, the turbine 38, and the stator 44. The fluid exerts a hydrodynamic torque on the turbine 38. The stator 44 provides a reaction force causing the torque on the turbine 38 to be greater than the torque on the impeller 36. When the speed of the turbine 38 approaches that of the impeller 36, fluid tends to flow around the centerline of the torque converter, causing the one-way clutch 46 to overrun.

The torque converter 21 may include a bypass clutch 50 that mechanically connects the turbine 38 to the cover 30 to bypass the hydrodynamic power flow path of the torque converter 21. The bypass clutch 50 is often engaged during cruise to improve fuel efficiency. The bypass clutch 50 may include a clutch disc 52 operated by a clutch piston (internal piston) 54. The piston 54 may be an annular plate. The clutch disc 52 may include at least one friction material 56 disposed thereon. The clutch disc 52 is sandwiched between the clutch piston 54 and an inside surface 58 of the front cover 34. The clutch 50 is engaged by moving the clutch piston 54 towards the front cover 34 to frictionally lock the clutch disc 52 to the cover 30. The turbine 38 is fixed to the clutch disc 52 by a damper 60. Thus, the turbine 38 is fixed to the cover 30 when the bypass clutch 50 is fully engaged to bypass the hydrodynamic power flow path and instead mechanically couple the engine or electric machine to the transmission. Other bypass clutch designs may be used in the torque converter assembly 20. The clutch piston 54 of the illustrated embodiment may be hydraulically actuated by supplying fluid, e.g., oil, to the hydrodynamic chamber 40. Other types of bypass clutches may include a dedicated fluid chamber for stroking the clutch piston, in which case, fluid is supplied to the dedicated fluid chamber to engage the clutch.

Disconnect clutch 32 selectively couples the input 22 to cover 30. When the disconnect clutch 32 is engaged (close or locked) the engine is coupled to the electric machine and the transmission, and when the clutch 32 is disengaged (open or unlocked) the engine is isolated from the electric machine and the transmission. The disconnect clutch 32 selectively couples the first input 22 to the front cover 34 so that the cover 30 generally rotates in unison with the crankshaft of the engine.

The disconnect clutch 32 may include a first member fixedly coupled to the input 22 and a second member fixedly coupled to the cover 30. The first member may be directly connected to the input 22 by welding or other attachment means and the second member may be directly connected to the cover 30 by welding or other attachment means. The disconnect clutch 32 includes a clutch mechanism configured to fix the first and second members when the clutch is engaged and permit relative rotation between the first and second members when the clutch 32 is disengaged. The disconnect clutch 32 may be any type of clutch capable of engaging and disengaging an engine with the torque converter 21. Example clutches include: wedge clutches, roller clutches, dry friction clutches, and wet friction clutches (in both single disc or clutch pack varieties).

The disconnect clutch 32 may be actuated by an external piston 150. The external piston 150 may be a piston ring having an outer circumferential surface 152 and an inner circumferential surface 154. The external piston 150 may be positioned adjacent to the front cover 34 and between the disconnect clutch 32 and the torque converter 21. The external piston 150 may be axially movable relative to the disconnect clutch 32. For example, the inner surface 154 may be slidably received on a seat 156 defined by an external surface 158 of the front cover 34. In one or more embodiments, movement of the piston 150 towards the disconnect clutch 32 to a first position disengages the disconnect clutch and movement towards the torque converter 21 to a second position allows the disconnect clutch 32 to re-engage (here, the disconnect clutch is biased locked). A resilient member 170, e.g., a return spring, may bias the piston 150 to the second position.

A sealing ring 160 may circumscribe the external piston 150 and the seat 156. The sealing ring 160 includes an axially extending surface 162 adjacent to the outer surface 152 and a radial extending surface 164 that is fixedly coupled, e.g., directly connected, to the front cover 34. A seal 166 may be disposed between the seat 156 and the piston 150, and a seal 166 may be disposed between the axial extending surface 162 and the piston 150. The seat 156 and the sealing ring 160 cooperate to define an annular cavity in which the piston 150 is slidably received.

The external piston 150 may be hydraulically actuated. The external piston 150 may be in fluid communication with the hydrodynamic chamber 40 and controlled by supplying fluid pressure into the hydrodynamic chamber 40. The front cover 34 may define one or more fluid holes 172 extending completely through a wall 173 of the front cover 34 allowing fluid to flow out of the torque converter 21 and contact a backside 184 of the external piston 150. In the illustrated embodiment, the front cover 34 defines a plurality of fluid holes 172 circumferentially arranged around the wall 173. The front cover 34 may include one or more bosses 176, each extending from the inner surface 58 and defining a corresponding hole 172. The diameter of the external piston 150 and the diameter of the array of fluid holes 172 are similar so that fluid exiting the holes 172 contacts the backside 184 of the piston 150. The sealing ring 160, the piston 150, and the front cover 34 cooperate to define a fluid chamber 180 for stroking the piston 150. The seals 166 inhibit fluid from leaking from the chamber 180.

The internal piston 54 of the bypass clutch 50 may define a plurality of openings 182 having a diameter that is larger than the bosses 176 so that the bosses 176 can be received therein. A plurality of seals 186 may be disposed between the openings 182 and the bosses 176. The openings 182 provide passageways for fluid to flow from the hydrodynamic chamber 40 to the at least one fluid chamber 180.

The disconnect clutch 32 may be disengaged by supplying fluid to the hydrodynamic chamber 40 such that a fluid pressure within the chamber 40 exceeds a first threshold that is sufficient to overcome the bias of the resilient member 170. The disconnect clutch 32 may be reengaged by reducing fluid pressure within the hydrodynamic chamber 40 so that the resilient member 170 returns the external piston 150 to the second position. As stated above, the bypass clutch 50 is also actuated according to fluid pressure within the hydrodynamic chamber 40. That is, both the bypass clutch 50 and the disconnect clutch 32 are controlled by the same fluid chamber. To allow separate actuation of these two clutches, the external piston 150 of the disconnect clutch 32 is designed to stroke responsive to the fluid pressure exceeding the first threshold and the internal piston 54 of the bypass clutch 50 is designed to stroke responsive to the fluid pressure exceeding a second threshold, which is less than the first threshold. Alternatively, in other embodiments, it may be desirable for the external piston 150 to actuate with the internal piston 54 such that the first threshold is equal to the second threshold. In other embodiments, each of the clutches 32 and 50 may have a dedicated fluid circuit to allow fully independent operation of these clutches as opposed to independent operation of only one of the clutches.

The design of the external piston 150, the magnitude of the first threshold, and the strength of the resilient member 170 (and whether a resilient member is present) may depend upon the design of the disconnect clutch including, type, size, clutch capacity, etc. In the illustrated embodiment, the disconnect clutch 32 is a wedge clutch. A wedge clutch locks via wedging action within the clutch and does not rely on the external piston 150 for generating clutch capacity. In fact, some wedge clutches are biased to engage, in which case the piston 150 is used to disengage the clutch as opposed to apply it. In other clutch types, e.g., wet friction clutches, the piston 150 is used to create clutch capacity. Therefore, the fluid circuits for the external piston 150 may vary.

The wedge clutch may include an inner race 70, an outer race 72, and a wedge element 74 radially disposed between the inner and outer races 70, 72. The inner and outer races may be concentric. The wedge element 74 may be a disc, multiple axially stacked discs, or a cylinder. The wedge element 74 is configured to lock the inner and outer races 70, 72 when the clutch 32 is engaged and to permit relative rotation between the inner and outer races 70, 72 when the clutch is disengaged. The inner race 70 may be fixedly coupled to the input 22, and the outer race 72 may be fixedly coupled to the cover 30. The inner and outer races 70, 72 may be fixedly coupled to their respective components by welding, fasteners, and the like. In an alternative embodiment, the inner race 70 may be fixedly coupled to the cover 30 and the outer race 72 may be fixedly coupled to the input 22. The inner race 70 may be annular and seated on a pilot hub 76 of the cover 30. A bearing 80, e.g., a roller bearing, or other friction-reducing mechanism may be disposed between an inner circumferential surface 78 of the inner race 70 and the pilot hub 76. The outer race 72 may be fixedly coupled to the cover 30 by an interconnecting plate 82. The interconnecting plate 82 may include a first end that is attached to the outer race 72 and a second end attached to the second input 24, the cover 30, or both. The interconnecting plate 82 may be attached by welding, fasteners, or the like.

Referring to FIGS. 1 and 3A, the wedge clutch operates by radially expanding and contracting the wedge element 74 between the inner and outer races 70, 72 to disengage and engage the clutch, respectively. The wedge clutch has a cam surface 88 formed on one of the inner and outer races 70, 72. The race that does not have a cam surface 88 defines a circular groove 90 configured to frictionally engage with the wedge element 74. In the illustrated embodiment, the outer race 72 defines the cam surface 88 on an inner circumferential surface, and an outer circumferential surface of the inner race 70 defines the groove 90. The groove 90 and cam surface 88 can be flipped in other embodiments with the groove being formed on the outer race and the cam surface being formed on the inner race.

When the clutch 32 is engaged, friction between the inner edge of the wedge element 74 and the groove 90 rotationally locks the wedge element 74 to the inner race 70. The wedge element 74 includes a cam surface 92 that engages and cooperates with the cam surface 88. The cam surface 88 defines a plurality of ramps configured to engage with lobes of the cam surface 92 to wedge the wedge element 74 between the inner and outer races responsive to the wedge element 74 and the outer race 72 rotating relative to each other. The wedging action induced by the cam surfaces 88, 92 tightly clamps the wedge element 74 to the inner race 70 creating a friction coupling. The ramps and lobes are sized so that they cannot slide over each other and cooperate to lock the wedge element 74 to the outer race 72.

Referring to FIGS. 3A and 3B, the wedge element 74 may be formed of a plurality of arcuate segments 100 circumferentially arranged between the inner and outer races 70, 72. The segments 100 are arranged in pairs to form a plurality of arcuate wedge sections 102 of the wedge element 74. Each of the sections 102 includes a first segment 100a and a second segment 100b, which may be mirror images of each other. The segment pairs are arranged with first ends 104 facing each other and with second ends 106 facing away from each other. A plurality of resilient members 108, such as coil springs, are circumferentially arranged between the sections 102. The resilient members 108 bias the segments 100a and 100b towards each other, and bias the sections 102 away from each other. In the illustrated embodiment, there are ten segments arranged into five sections 102 and ten resilient members 108 (two resilient members disposed between each segment). Different amounts of segments, sections, and resilient members may be used in other embodiments.

The thickness of each segment 100 varies between the first and second ends 104, 106 to create the cam surface 92. The second end 106 is radially thicker than the first end 104 causing the outer surface 112 to slope radially outward from the first end 104 towards the second end 106. The outer surface 112 of each segment 100 defines a portion of the cam surface 92. The above-mentioned lobes, indicated by 113, are the outer-most portion of the cam surface 92 and are generally formed by the outer surfaces 112 near the second ends 106. The inner surface 111 of each segment 100 is a smooth arc having a constant radius that substantially matches that of the outer diameter of the inner race 70.

The cam surface 88 of the outer race 72 has a profile that substantially matches the cam surface 92 of the wedge element 74. The cam surface 88 includes radially extending ramps 116 and pockets 118. The matching shapes of the of the cam surfaces 88, 92 allows the wedge element 74 to nest within the outer race 72 with the lobes 113 disposed in the pockets 118.

The resilient members 108 bias the wedge element 74 to the contracted position in which each of the segments 100 are in frictional contact with the inner race 70 creating sufficient drag to rotate the wedge element 74 relative to the outer race 72 if input 22 receives power. Relative rotation between the outer race 72 and the wedge element 74 misaligns the cam surfaces 88, 92, i.e., the ramps 116 slide into the lobes 113, causing further radial contraction of the wedge element 74. This further radial contraction clamps the wedge element 74 onto the inner race 70 with sufficient friction force to rotationally lock the inner and outer races 70, 72, which engages the clutch 32.

Referring to FIGS. 2 through 4B, the disconnect clutch 32 can be disengaged by separating the segments 100a and 100b of each pair to move the wedge element 74 to the expanded position as shown in FIG. 3B. The external piston 150 causes the wedge element 74 to move between the contracted and expanded positions. The piston 150 may include a plurality of axially extending projections (fingers) 134 extending from a front side and configured to be received in slots 140 of the sections 102. The fingers 134 are circumferentially arranged around the piston 150. The number of fingers 134 may be equal to the number of sections 102 and in the illustrated embodiment, the piston 150 has five fingers 134.

Each of the slots 140 may be recessed into a corresponding one of the sections 102 with the first segment 100a defining one half of the slot and the second segment 100b defining the other half of the slot. Each slot 140 includes a first portion 142, a second portion 144 that is narrower than the first portion, and a sloped portion 146 that transitions between the first and second portions 142, 144. The fingers 134 may have a shape that substantially matches the slots 140. Each of fingers 134 may include a main portion 138 and a tip 141. The main portion 138 is sized to snugly fit within the first portion 142 and the tip 141 is sized to snuggly fit within the second portion 144. The fingers 134 also include angled sides 143 that match the sloped portions 146 of the slots 140.

Axial movement of the piston 150 towards the wedge element 74 disengages the clutch 32 by driving the angled sides 143 into the sloped portion 146 to separate the segments pairs 100a and 100b of each section 102 moving the clutch element 74 to the expanded position. The amount of separation can be tuned by adjusting the width of the fingers 134 and the slots 140. The axial force required to separate the segments pairs can be adjusted by modifying the slope of the angled sides 143 and the sloped portions 146. The clutch 50 can be re-engaged by retracting the fingers 134 and allowing the resilient members 108 to urge the wedge element 74 to rotate relative to the outer race 72.

The above-described wedge clutch is merely one example of a wedge clutch that may be used as a disconnect clutch in the torque converter assembly 20. Other types of wedge clutches may also be suitable. For example, another type of wedge clutch may include a tapered hub that has a first cam surface. The wedge element is seated on the tapered hub with a second cam surface of the wedge element engaging with the first cam surface. This wedge clutch engages by rotating the hub relative to the wedge element to misalign the cam surfaces. This type of clutch is engaged and disengaged by axially sliding the wedge element relative to the hub between a larger diameter portion (engagement area) and a smaller diameter portion (disengagement area). The external piston 54 may be used to slide the wedge element on the hub controlling actuation of the clutch.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST 20 torque converter assembly
21 torque converter
22 first input
24 second input
26 flex plate
28 damper
30 cover
32 disconnect clutch
34 front cover
35 rear cover
36 impeller
38 turbine
40 hydrodynamic chamber
42 turbine hub
44 stator
46 one-way clutch
50 bypass clutch
52 clutch disc
54 clutch piston
56 friction material
58 inner surface
60 damper
70 inner race
72 outer race
74 clutch element
76 pilot hub
78 inner circumferential surface
80 bearing
82 interconnecting plate
88 cam surface 90 groove
92 cam surface
100 segments
102 sections
104 first end
106 second end
108 resilient members
111 inner surface
112 outer surface
113 lobes
116 ramp
118 pocket
134 finger
138 main portion
140 slot
141 tip
142 first portion
143 angled sides
144 second portion
146 sloped portion
150 external piston
152 outer circumferential surface
154 inner circumferential surface
156 seat
158 external surface
160 sealing ring
162 axial extending surface
164 radial extending surface
166 seal
170 resilient member
172 fluid holes
173 wall
176 bosses
180 fluid chamber
184 backside
186 seals

What is claimed is:

1. A torque converter assembly comprising:
an input plate connectable to a powerplant;
a torque converter including a cover having an outer surface and at least one fluid hole extending through the cover; and
a disconnect clutch external to the torque converter and configured to selectively couple the input plate to the cover, wherein the disconnect clutch is configured to actuate in response to pressurized fluid via the fluid hole.

2. The torque converter assembly of claim 1 further comprising an axially movable piston adjacent to the outer surface of the cover to be acted on by the pressurized fluid, wherein axial movement of the piston by the pressurized fluid actuates the disconnect clutch.

3. The torque converter assembly of claim 2, wherein the piston defines an inner circumferential surface, and the outer surface of the cover defines a seat that supports the inner circumferential surface of the piston thereon.

4. The torque converter assembly of claim 2 further comprising a piston sealing ring encircling the piston, wherein the sealing ring, the piston, and the cover cooperate to define a piston chamber of the disconnect clutch.

5. The torque converter assembly of claim 2 further comprising a resilient member disposed between the piston and the disconnect clutch and biasing the piston away from the disconnect clutch.

6. The torque converter assembly of claim 1, wherein the at least one fluid hole is a plurality of fluid holes circumferentially arranged around the cover.

7. The torque converter assembly of claim 1, wherein the disconnect clutch is a wedge clutch.

8. The torque converter assembly of claim 7, wherein the wedge clutch includes an inner race connected to the input plate, an outer race connected to the outer surface of the cover, and a wedge element radially disposed between the inner and outer races.

9. The torque converter assembly of claim 1, wherein the torque converter further includes an impeller, a turbine, and a bypass clutch configured to mechanically couple the cover to the turbine, the bypass clutch having an internal piston controlled according to fluid pressure within the cover.

10. The torque converter assembly of claim 9, wherein the internal piston defines at least one fluid opening aligned with the at least one fluid hole.

11. A torque converter assembly comprising:
an input plate connectable to a powerplant;
a torque converter including a cover having an outer surface and at least one fluid hole extending through the cover; and
a disconnect clutch outside of the torque converter including:
a first member fixedly coupled to the input plate,
a second member fixedly coupled to the cover, and
a piston configured to be acted on by fluid within a hydrodynamic chamber of the torque converter via the fluid hole; wherein
the piston is axially movable, according to a pressure of the fluid, between a first position corresponding to the disconnect clutch being engaged and a second position corresponding to the disconnect clutch being disengaged.

12. The torque converter assembly of claim 11, wherein the disconnect clutch further includes a resilient member biasing the piston to the first position, wherein the resilient member is configured to maintain the piston in the first position until the pressure exceeds a first threshold pressure.

13. The torque converter assembly of claim 12, wherein the torque converter further includes a bypass clutch having a piston plate disposed in the hydrodynamic chamber and actuated according to the pressure of the fluid in the hydrodynamic chamber, wherein the piston plate is configured to rotationally couple to the cover in response to the pressure exceeding a second threshold pressure that is less than the first threshold pressure.

14. The torque converter assembly of claim 13, wherein the cover has at least one boss extending from an inside surface of the cover, and the boss defines the at least one fluid hole, and wherein the piston plate defines a hole that receives the boss therein.

15. The torque converter assembly of claim 11, wherein the piston is annular.

16. The torque converter assembly of claim 11, wherein the disconnect clutch is a wedge clutch having a wedge element configured to couple the first and second members, wherein the piston engages with the wedge element when in the second position to disengage the clutch.

17. The torque converter assembly of claim 16, wherein the wedge element includes a plurality of arcuate segments, and the piston includes axially extending projections configured to circumferentially move the arcuate segments.

* * * * *